United States Patent Office 3,413,315
Patented Nov. 26, 1968

1

3,413,315
NOVEL CYCLOPENTAPYRANONES
AND BENZOPYRANONES
Reinhardt P. Stein, Conshohocken, George C. Buzby, Jr., Philadelphia, and Herchel Smith, Wayne, Pa., assignors to American Home Products Corporation, New York, N.Y., a corporation of Delaware
No Drawing. Filed May 9, 1966, Ser. No. 548,406
8 Claims. (Cl. 260—345.2)

ABSTRACT OF THE DISCLOSURE

This invention relates to 2,3,6,7-tetrahydro-1',2',3',4'-tetrahydrospiro[cyclopenta(b)pyran - 2(4H),1' - naph-

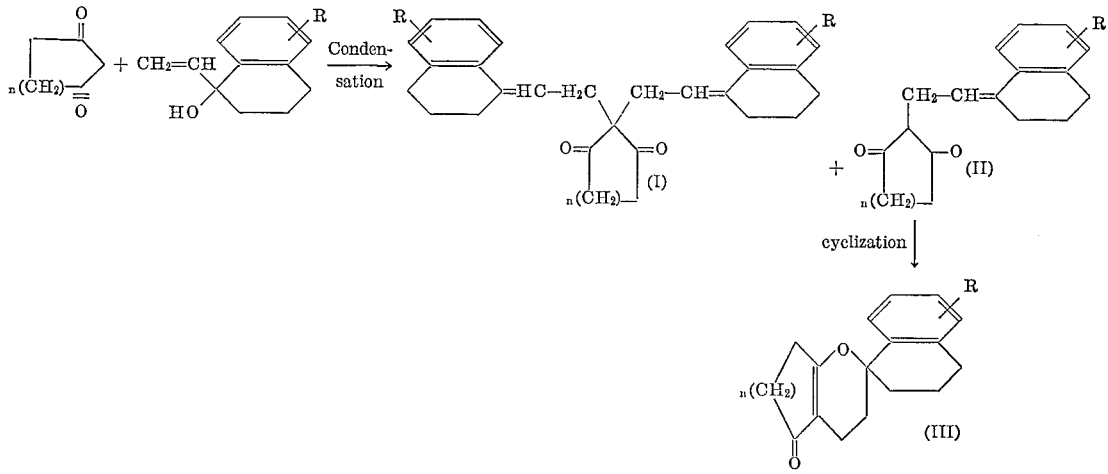

thalen] - 5 - ones and 2,3,5,6,7,8 - hexahydro - 1',2',3',4'-tetrahydrospiro[4H - benzopyran - 2,1' - naphthalen] - 5-ones which are pharmacologically active as depressant and anticonvulsant agents.

This invention relates to new and useful cyclic ketone compounds as well as to the novel method for their preparation. In particular, the present invention is concerned with 2,3,6,7 - tetrahydro - 1',2',3',4' - tetrahydrospiro[cyclopenta(b)pyran - 2(4H), 1' - naphthalen] - 5 - ones and 2,3,5,6,7,8 - hexahydro - 1',2',3',4' - tetrahydrospiro [4H - benzopyran - 2,1' - naphthalen] - 5 - ones having pharmacological activity.

The novel compounds which are included within the scope of this invention are selected from the group represented by the formula:

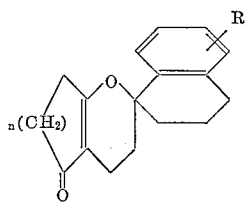

wherein R is selected from the group consisting of hydrogen, lower alkoxy and lower alkyl; and n is an integer from 1 to 2. Examples of such compounds include 2,3,5, 6,7,8 - hexahydro - 1',2',3',4'-tetrahydro - 6' - methoxy-

2 spiro[4H - benzopyran - 2,1' - naphthalen] - 5 - one; 2, 3,6,7 - tetrahydro - 1',2',3',4' - tetrahydro - 6' - methoxyspiro[cyclopenta(b)pyran - 2(4H),1' - naphthalen] - 5-one; and 2,3,6,7 - tetrahydro - 1',2',3',4' - tetrahydro - 6'-methylspiro[cyclopenta(b)pyran - 2(4H), 1' - naphthalen]-5-one.

In accord with the process of the present invention, the compounds of this invention are formed by the cyclization of 2 - [2 - (3,4 - dihydro - 1(2H) - naphthylidene) ethyl]cycloalkane-1,3-diones which are coproduced with the corresponding bis compound by the condensation of an appropriate 1-vinyl-1-tetralol with 1,3-cyclopentadione or 1,3-cyclohexadione. The following schematic sequence of reactions illustrates this procedure:

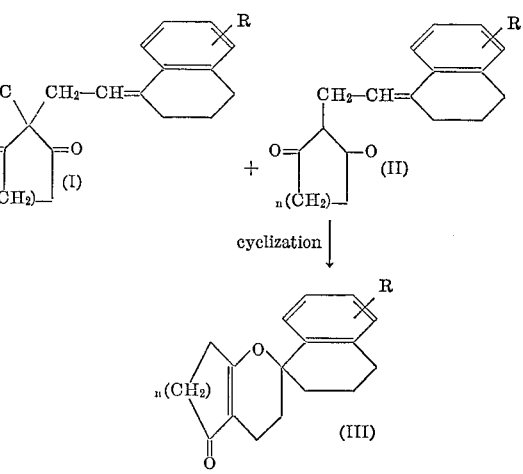

wherein R and n are as defined above. The reaction is effected by refluxing a substantially equimolar mixture of a 1-vinyltetralol and a 1,3-cycloalkanedione in an alkaline solvent for about one hour. Suitably this reaction may be conducted in a xylene-t-butanol mixture, in the presence of benzyltrimethylammonium hydroxide. After the reaction is complete, the reaction mixture which contains a 2,2 - bis[2 - (3,4 - dihydro - 1(2H) - naphthylidene) ethyl]cycloalkane-1,3-dione (I) and a 2-[2-(3,4-dihydro-1(2H)-naphthylidene)ethyl]cycloalkane-1,3-dione (II) as coproducts is cooled, admixed with ether and extracted with successive portions of an alkaline aqueous solution. The 2,2 - bis[2 - (3,4 - dihydro - 1(2H) - naphthylidene)ethyl]cycloalkane-1,3-dione (I) is then separated from the ether layer by conventional recovery procedures e.g. concentration and crystallization. The 2-[2-3, 4-dihydro - 1(2H) - naphthylidene)ethyl]cycloalkane - 1, 3-dione (II) is isolated from the combined aqueous alkaline extracts by careful acidification to a pH of about 5 with a mineral acid e.g. hydrochloric acid. The resulting precipitate is the desired product (II) which may be further purified by procedures well known to those skilled in the art of chemistry, such as, recrystallization from methylene chloride.

Cyclization of a 2-[2-(3,4-dihydro-1(2H)-naphthylidene)ethyl]cycloalkane-1,3-dione (II) is effected by refluxing the appropriate compound (II) in a reactioninert organic solvent, in the presence of a strong acid, for a period of about five to about fifteen minutes. Preferably this reaction is conducted in benzene in the presence of p-toluenesulfonic acid. By strong acid as employed herein is meant both mineral and organic acids, such as, hydrochloric acid, alkanesulfonic and arylsulfonic acids, for example, benzenesulfonic and toluenesulfonic acid, methanesulfonic and ethanesulfonic acid. By reaction-inert organic solvent as utilized herein is meant any organic solvent which will dissolve the reactants and not interfere with their interaction. Other such solvents will be obvious to those skilled in the art, for example, toluene and xylene.

After the cyclization reaction is complete, the reaction mixture is cooled and extracted with an immiscible organic solvent e.g. ether, diisopropyl ether, ethyl acetate and benzene. The extract is then washed with an aqueous alkaline solution such as sodium hydroxide, potassium hydroxide, sodium bicarbonate and potassium bicarbonate. Thereafter, the cyclopentapyranone or benzopyranone (III) is obtained by conventional methods such as filtration, concentration and crystallization.

The majority of the reactants utilized in the preparation of the compounds of this invention are known compounds which are readily available from commercial sources, while the remainder can be prepared in accordance with standard organic procedures well known to those skilled in the art.

In accord with the present invention, the new and novel compounds of this invention have been found to possess interesting pharmaceutical properties which render them useful as synthetic medicinals. More particularly, these compounds, in standard pharmacological tests, have exhibited utilities as depressant and anticonvulsant agents.

When the compounds of this invention are employed as depressant and anticonvulsant agents they may be administered alone or in combination with pharmaceutically acceptable carriers, the proportion of which is determined by the solubility and chemical nature of the compound, chosen route of administration and standard pharaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1 mg. to about 400 mg. per day, although as aforementioned variations will occur. However, a dosage level that is in the range of from about 10 mg. to about 200 mg. per day is most desirably employed in order to achieve effective results.

The following examples are given by way of illustration and are not to be construed as limitations of this invention, many variations of which are possible without departing from the scope and spirit thereof.

Example I 6-methoxy-1-vinyl-1-tetralol (1.025 g.), 3.5 ml. of dry xylene, 1.8 ml. of dry t-butanol, 1,3-cyclopentadione (0.490 g.) and 0.19 ml. of benzyltrimethylammonium hydroxide (a 40% solution in methanol) are refluxed for exactly one hour. The reaction is cooled to room temperature and diluted with ether. A yellow gum forms upon the addition of ether, but does not crystallize. The mixture is washed with saturated sodium bicarbonate solution (the gum dissolves into the aqueous layer). The ether extract is washed with 5% KOH solution (3×25 ml.) and set aside. The aqueous extracts are combined and carefully adjusted to pH 7 with hydrochloric acid. The resulting precipitate is filtered and dried (crude weight 0.243 g.). The solid is triturated with ether, filtered and dried to give 0.190 g. of white solid, M.P. 165–166° C. This material has

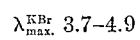

(broad OH) and 5.4μ;

$$\lambda^{EtOH}\ 264\ m\mu\ (\log\ \epsilon\ 4.51)$$

A sample is taken up in boiling tetrahydrofuran, treated with activated charcoal (Norit-A) and filtered through supercel. The filtrate is concentrated and ether is added to give 2-[2-(3,4-dihydro-6-methoxy-1(2H)-naphthylidene)ethyl]cyclopentane-1,3-dione as an off-white crystalline solid, M.P. 165–166° C.

The above prepared 2 - [2-(3,4-dihydro-6-methoxy-1 (2H) - naphthylidene)ethyl]cyclopentane-1,3-dione (0.24 g.) is dissolved in dry benzene (6 ml.) and p-toluenesulfonic acid monohydrate (13 mg.) is added. The mixture is refluxed (Dean-Stark water separator) until all the water is removed (10–15 minutes). The reaction is then cooled to room temperature and diluted with ether. The ether extract is washed with saturated sodium bicarbonate solution and with water then dried over anhydrous sodium sulfate. The solution is filtered and the filtrate evaporated to a yellow oil in vacuo. An IR and UV spectral analysis shows the absence of starting material and no UV band beyond 300 mμ. The IR indicates only the presence of a cyclopentenone carbonyl system (5.92μ) and the NMR indicates the absence of vinyl protons. The oil is further purified by dissolution in boiling cyclohexane, treatment with activated charcoal (Norit-A) and filtration (hot) through supercel. The filtrate is evaporated in vacuo to a yellow oil. The process is then repeated (using Nuchar charcoal) to give a nearly colorless oil (188 mg.). On standing for about one week, the oil begins to crystallize. Trituration with a small amount of ether completes the crystallization. Colorless prisms of 2,3,6,7 - tetrahydro-1′,2′,3′,4′ - tetrahydro - 6′ - methoxyspiro[cyclopenta(b) pyran-2 (4H), 1′-naphthalen]-5-one are then separated by filtration and dried (vacuum at 78° C.); M.P. 93–95° C.;

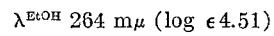

(log ε 4.38) and 282 mμ (aromatic, log ε 3.45).

Calcd. for $C_{18}H_{20}O_3$: C, 76.03; H, 7.09%. Found: C, 76.05; H, 7.18%.

The above ether extract which is set aside is then washed with water and dried over anhydrous sodium sulfate. The solution is filtered and the filtrate stripped in vacuo to an oil. The oil is triturated with methanol and the resulting suspension is filtered to give a solid (0.250 g.), M.P. 115–118° C. This material is taken up in methylene chloride, treated with activated charcoal (Nuchar) and filtered through super cel. The filtrate is boiled to low volume and replaced with ethanol. On standing, colorless needles crystallize out of solution. The needles are filtered and dried to give 0.200 g. of 2,2-bis[2-(3,4-dihydro-6-
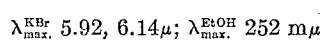

methoxy-1 (2H)-naphthylidene)ethyl]cyclopentane-1,3-dione, M.P. 121–122° C.;

$\lambda_{max.}^{KBr}$ 5.79

(weak shoulder at 5.67), 6.23μ;

$\lambda_{max.}^{EtOH}$ 268.5 mμ

(log ε 4.55) and inflection at 295 mμ (log ε 4.10).

Calcd. for $C_{31}H_{34}O_4$: C, 79.12; H, 7.28%. Found: C, 78.99; H, 7.29%.

Similarly, by cyclizing 6-propoxy-8,14-secogona-1,3,5(10),9(11)tetraen-14,17-dione, which is prepared by the condensation of 6-propoxy-1-vinyl-1-tetralol and 1,3-cyclopenadione, there is obtained 2,3,6,7-tetrahydro-1',2',3',4'-tetrahydro - 6' - propoxyspiro[cyclopenta(b)pyran - 2 (4H), 1'-naphthalen]-5-one.

Example II 6-methyl-1-vinyl-1-tetralol (2.0 g.), 7.0 ml. of dry xylene, 3.6 ml. of dry t-butanol, 1,3-cyclopentadione (0.98 g.) and 0.6 ml. of benzyltrimethylammonium hydroxide (a 40% solution in methanol) are refluxed for exactly one hour. The reaction is cooled to room temperature and diluted with ether which causes the formation of a yellow gum. The mixture is washed with saturated sodium bicarbonate solution (the gum dissolves into the aqueous layer). The ether extract is washed with 5% KOH solution (3×50 ml.) and set aside. The combined aqueous extracts are acidified to pH 5 with hydrochloric acid and the resulting precipitate filtered and dried. The solid is triturated well with methylene chloride, filtered, dried, taken up in boiling tetrahydrofuran, treated with activated charcoal (Norit-A) and filtered through supercel. The filtrate is concentrated and ether is added to yield 2-[2-(3,4-dihydro - 6 - methyl - 1 (2H) - naphthylidene)ethyl]cyclopentane-1,3-dione.

The above prepared cyclopentane-1,3-dione is dissolved in dry toluene (12 ml.) and methane sulfonic acid (20 mg.) are added. The mixture is refluxed in a Dean-Stark water separator until all the water is removed (10–15 minutes). The reaction mixture is then cooled to room temperature and diluted with ether. The ether extract is washed with saturated sodium bicarbonate solution and with water, then dried over anhydrous sodium sulfate. The solution is filtered and the filtrate evaporated under vacuum. The residue is further purified by dissolution in boiling cyclohexane, treatment with activated charcoal and filtration (hot) through supercel. The filtrate is evaporated in vacuo and the process is then repeated to yield 2,3,6,7 - tetrahydro - 1',2',3',4' - tetrahydro - 6' - methylspiro[cyclopenta(b)pyran-2 (4H), 1'-naphthalen]-5-one.

The aforesaid extract is then washed with water and dried over anhydrous sodium sulfate. The solution is filtered and the filtrate stripped in vacuo. The residue is triturated with methanol, the suspension filtered to give a solid which is taken up in methylene chloride, treated with activated charcoal (Nuchar) and filtered through super cel. The filtrate is boiled to low volume and replaced with ethanol. On standing, 2,2-bis[2-(3,4-dihydro-6-methyl-1(2H)-naphthylidene)ethyl]cyclopentane-1,3-dione precipitates and is separated by filtration.

In the same manner, 7-ethyl-1-vinyl-1-tetralol is reacted with 1,3-cyclopentadione to coproduce 2-[2-(7-ethyl-3,4-dihydro -1 (2H) - naphthylidene)ethyl]cyclopentane - 1,3-dione and the corresponding bis compound. The 2-[2-(7-ethyl - 3,4 - dihydro - 1(2H) - naphthylidene)ethyl]cyclopentane-1,3-dione is then separated and cyclized to form 7' - ethyl - 2,3,6,7 - tetrahydro - 1',2',3',4' - tetrahydrospiro[cyclopenta(b)pyran-2(4H), 1'-naphthalen]-5-one.

Example III

2-[2-(3,4-dihydro-1(2H) - naphthylidene)ethyl] cyclopentane-1,3-dione (1.0 g.) is dissolved in dry benzene (25 ml.) and p-toluenesulfonic acid monohydrate (50 mg.) is added. The mixture is refluxed for ten minutes in a Dean-Stark water separator. The reaction mixture is then cooled to room temperature and diluted with ethyl acetate. The ethyl acetate extract is washed with 0.1 N sodium hydroxide solution and with water then dried over anhydrous sodium sulfate. The solution is filtered, the filtrate evaporated and the residue is dissolved in hot ethyl acetate. The ethyl acetate solution is treated with activated charcoal (Norit-A) and then filtered (hot) through super cel. The filtrate is evaporated in vacuo to yield 2,3,6,7-tetrahydro - 1',2',3',4' - tetrahydrospiro[cyclopenta(b)pyran-2(4H), 1'-naphthalen]-5-one.

Example IV 6-methoxy-1-vinyl-1-tetralol (4.10 g.) is dissolved in a mixture of 14 ml. of dry xylene and 7 ml. of dry-t-butanol and admixed with 1,3-cyclohexadione (2.24 g.) and 40% methanolic benzyltrimethylammonium hydroxide (0.75 ml.). The mixture is refluxed for one hour. The red solution is cooled to room temperature, diluted with ether and the resulting brown precipitate filtered, washed with ether and dried to yield 1.49 g. of crude product. The product is dissolved in boiling tetrahydrofuran, treated with activated charcoal (Norit-A), filtered hot through supercel, concentrated and allowed to crystallize to yield 0.72 g. of 2-[2-(3,4-dihydro-6-methoxy-1(2H)-naphthylidene)ethyl]cyclohexene - 1,3 - dione as small colorless prisms, M.P. 180–181° C.;

$\lambda_{max.}^{KBr}$ 3.8–4.7, 5.5μ; $\lambda_{max.}^{EtOH}$ 265 mμ (log ε 4.51)

Calcd. for $C_{19}H_{22}O_3$: C, 76.48; H, 7.43%. Found: C, 76.55; H, 7.59%.

The above prepared compound (0.500 g.) is dissolved in benzene (15 ml.) containing p-toluenesulfonic acid monohydrate (26 mg.). The mixture is refluxed (Dean-Stark water separator) for ten minutes, cooled to room temperature and diluted with ether. The extract is washed with saturated sodium bicarbonate solution, water and saturated sodium chloride solution, then dried over anhydrous sodium sulfate. The solution is filtered and stripped to a yellow oil in vacuo. The oil is triturated with several drops of methanol at −70° C. to commence crystallization. The resulting solid is dissolved in boiling cyclohexane, treated with activated charcoal (Norit-A) and filtered hot through supercel. The filtrate is boiled to low volume and one drop of methanol added thereto. The solution is seeded and the resulting slightly yellow crystals are filtered, washed with cyclohexane and dried to yield 0.230 g. of 2,3,5,6,7,8-hexahydro-1',2',3',4'-tetrahydro-6'-methoxyspiro[4H-benzopyran-2,1'-naphthalen]-5-one.

A sample is further purified by crystallization from benzene-hexane then from benzene-hexane-cyclohexane (2:1:1) to give colorless prisms of the product isolated as the benzene hemi-solvate; M.P. 93–95° C.;

$\lambda_{max.}^{KBr}$ 6.1μ; $\lambda_{max.}^{EtOH}$ 265 mμ (log ε 4.34)

Calcd. for $C_{19}H_{22}O_3 \cdot \frac{1}{2} C_6H_6$: C, 78.31; H, 7.47%. Found: C, 78.23; H, 7.43%.

Example V

A mixture of 1,3-cyclohexadione (3.00 g.) and about 20 mg. of potassium bicarbonate are stirred in methanol (5 ml.) for fifteen minutes and then admixed with a solution of 6-methoxy-1-vinyl-1-tetralol (4.84 g.) in methanol (15 ml.). The solution is stirred at reflux for one hour then cooled to room temperature and stirred for two more hours. The resulting white crystalline product is filtered and washed with methanol. This material (4.00 g.) has M.P. 180–181° C. and is 2-[2-(3,4-dihydro-6-methoxy-1(2H)-naphthylidene)ethyl]cyclohexane-1,3 - dione. The methanol filtrate is diluted with ether to give a further 0.12 g. of the above compound and the organic layer is washed with saturated sodium bicarbonate solution, water and saturated sodium chloride solution, and then dried over anhydrous sodium sulfate. The extract is filtered and evaporated to a yellow oil in vacuo. The oil is triturated with methanol and allowed to crystallize. The resulting yellow crystals are filtered and dried to give 0.30 g. of the product. The product is further purified by dissolving in methylene chloride, treating with activated charcoal (Nuchar) and filtering through supercel. The filtrate is evaporated to an oil in vacuo which is dissolved in warm ethanol and allowed to stand to crystallize to give 0.20 g. of 2,2-bis-[2-(3,4-dihydro - 6 - methoxy-1(2H)-naphthylidene)ethyl]cyclohexane - 1,3 - dione as colorless needles, M.P. 138.5–140.0° C.;

$$\lambda_{max.}^{KBr}\ 5.90$$

(weak shoulder at 5.82) and 6.23μ;

$$\lambda_{max.}^{EtOH}\ 271\ m\mu$$

(log ε 4.60) and inflection at 296 mμ (log ε 4.18).

Calcd. for $C_{32}H_{36}O_4$: C, 79.31; H, 7.49%. Found: C, 78.96; H, 7.41%.

Example VI 1-vinyl-1-tetralol (8.0 g.) is dissolved in a mixture of 28 ml. of dry toluene and 14 ml. of dry-t-butanol. To this is added 1,3-cyclohexadiene (5.0 g.) and 40% methanolic benzyltrimethylammonium hydroxide (1.50 ml.). The mixture is refluxed for one hour, cooled to room temperature and then diluted with ether. The resulting precipitate is filtered, washed with ether and dried. The solid is dissolved in boiling THF, treated with activated charcoal, filtered hot through supercel, concentrated and allowed to crystallize to yield 2-[2-(3,4-dihydro-1(2H)-naphthylidene)ethyl]cyclohexane-1,3-dione.

The above prepared compound (1.0 g.) is dissolved in toluene (30 ml.) containing benzenesulfonic acid (50 mg.) and refluxed in a Dean-Stark water separator for ten minutes. Thereafter, the reaction mixture is cooled to room temperature and diluted with ether. The extract is washed with saturtaed sodium bicarbonate solution, water and saturated sodium chloride solution then dried over anhydrous sodium sulfate. The solution is filtered and evaporated in vacuo. The residue is 2,3,5,6,7,8-hexahydro - 1',2',3',4', - tetrahydrospiro[4H - benzopyran-2,1'-naphthalen]-5-one.

Example VII

6 - ethoxy - 1 - vinyl - 1 - tetralol (4.00 g.) is dissolved in a mixture of 14 ml. of dry xylene and 7 ml. of dry - t - butanol and admixed with 1,3 - cyclohexadione (2.0 g.) and 40% methanolic benzyltrimethylammonium hydroxide (0.75 ml.). The mixture is refluxed for one hour, cooled to room temperature and then diluted with ether. The resulting precipitate is filtered, washed with ether, dissolved in boiling THF, treated with activated charcoal and filtered hot through supercel. The filtrate is concentrated and allowed to crystallize to yield 2 - [2 - (6 - ethoxy - 3,4 - dihydro-1 (2H) - naphthylidene)ethyl]cyclohexane-1,3-dione.

The above prepared compound (0.50 g.) is dissolved in benzene (15 ml.) containing p - toluenesulfonic acid monohydrate (26 mg.). The mixture is refluxed (Dean-Stark water separator) for ten minutes, cooled to room temperature and diluted with ether. The extract is washed with a 0.1N potassium hydroxide solution, water and saturated sodium chloride solution then dried over anhydrous sodium sulfate. The solution is filtered, evaporated under vacuum and the residue triturated with several drops of methanol at −50° C. to cause crystallization. The resulting solid is dissolved in boiling cyclohexane, treated with activated charcoal (Norit-A) and filtered hot through supercel. The filtrate is boiled to low volume and one drop of methanol added. The solution is seeded and allowed to stand to crystallize. The resulting crystalline product is 6' - ethoxy - 2,3,5,6,7,8-hexahydro - 1',2',3',4', - tetrahydrospiro[4H - benzopyran-2,1'-naphthalen]-5-one.

In the same manner, 2,3,5,6,7,8 - hexahydro - 1',2', 3',4', - tetrahydro - 7' - propylspiro[4H - benzopyran-2,1'-naphthalen]-5-one is obtained.

Example VIII

The 2 - [2 - (3,4 - dihydro - 6 - methoxy - 1(2H)-naphthylidene)ethyl]cyclohexane - 1,3 - dione (0.28 g.), as prepared in Example V, is heated for ten minutes in methanol (20 ml.), concentrated hydrochloric acid (4 ml.) on a steam bath. The solution is diluted with water, extracted with ether and evaporated to yield 2,3,5,6,7,8-hexahydro - 1',2',3',4' - tetrahydro - 6' - methoxyspiro [4H - benzopyran - 2,1' - naphthalen]-5-one.

Example IX

A mixture of 1,3 - cyclopentadione (0.379 g.) and solid potassium hydroxide (20 mg.) are stirred in methanol (5 ml.) and then admixed with a solution of 6 - methoxy - 1 - vinyl - 1 - tetralol (0.730 g.) in methanol (5 ml.). The solution is refluxed for one hour, then cooled to room temperature and stirred for two more hours. The resulting white crystalline product is filtered and dried. This material (0.220 g.) has M.P. 165.5–167.0° C. and is 2 - [2 - (3,4 - dihydro - 6 - methoxy-1(2H) - naphthylidene)ethyl]cyclopentane - 1,3 - dione. The filtrate is set aside to be worked up later. The above product (85 mg.) is further purified by dissolving in boiling tetrahydrofuran treating with activated charcoal (Norit-A) and filtering hot through supercel. The filtrate is boiled to low volume and allowed to stand at room temperature to crystallize. The resulting tiny white plates of 2 - [2 - (3,4 - dihydro - 6 - methoxy - 1(2H) naphthylidene)ethyl]cyclopentane - 1,3 - dione are filtered and dried yielding 60 mg., m.p. 171–172° C.

$$\lambda_{max.}^{KBr}\ 3.7-4.9$$

(broad OH) 5.4 mμ;

$$\lambda_{max.}^{EtOH}\ 264\ m\mu\ (\log\ \epsilon\ 4.51)$$

Calcd. for $C_{18}H_{20}O_3$: C, 76.03; H, 7.09%. Found: C, 76.00; H, 7.18%.

The above methanol filtrate is diluted with ether and washed with saturated sodium bicarbonate solution and with 5% sodium hydroxide solution and then dried over anhydrous sodium sulfate. The extract is filtered and evaporated to an oil in vacuo. The oil is triturated with methanol and allowed to crystalize. The product is filtered and dried to give 230 mg. This material is further purified by dissolving in methylene chloride treated with activated charcoal (Nuchar) and filtering through supercel. The filtration is boiled and the solvent replaced with ethanol. On standing at room temperature the solution deposits 100 mg. of white needles of 2,2 - bis[2 - (3,4-dihydro - 6 - methoxy - 1(2H)naphthylidene)ethyl] cyclopentane - 1,3 - dione, m.p. 121–122.5° C. The infrared and ultraviolet spectral data are identical to the same product described in Example I (column 4).

What is claimed is:
1. A compound selected from the group consisting of those having the formula:

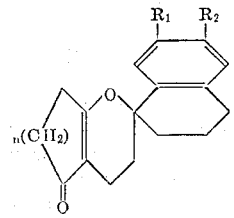

wherein $R_1$ and $R_2$ are selected from the group consisting of hydrogen, lower alkoxy and lower alkyl with the proviso that at least one of $R_1$ and $R_2$ is hydrogen; and n is an integer from 1 to 2.

2. A compound as described in claim 1 which is: 2,3,5,6,7,8 - hexahydro - 1',2',3',4' - tetrahydro - 6' - methoxyspiro [4H-benzopyran-2,1'-naphthalen]-5-one.

3. A compound as described in claim 1 which is: 2,3,6,7 - tetrahydro - 1',2',3',4' - tetrahydro - 6' - methoxyspiro [cyclopenta(b)pyran-2(4H), 1'-naphthalen]-5-one.

4. A compound as described in claim 1 which is: 2,3,6,7 - tetrahydro - 1',2',3',4' - tetrahydro - 6' - methyl-spiro [cyclopenta(b)pyran-2(4H), 1'-naphthalen]-5-one.

5. A compound as described in claim 1 which is: 2,3,6,7 - tetrahydro - 1',2',3',4' - tetrahydrospiro[cyclopenta(b)pyran-2(4H),1'-naphthalen]-5-one.

6. A compound as described in claim 1 which is: 2,3,5,6,7,8 - hexahydro - 1',2',3',4' - tetrahydrospiro[4H - benzopyran-2,1'-naphthalen]-5-one.

7. A compound as described in claim 1 which is: 6' - ethoxy - 2,3,5,6,7,8 - hexahydro - 1',2',3',4' - tetrahydrospiro[4H-benzopyran-2,1'-naphthalen]-5-one.

8. A process for the production of a compound having the formula:

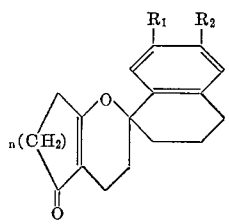

wherein $R_1$ and $R_2$ are selected from the group consisting of hydrogen, lower alkoxy and lower alkyl with the proviso that at least one of $R_1$ and $R_2$ is hydrogen; and $n$ is an integer from 1 to 2 which comprises contacting a compound of the formula:

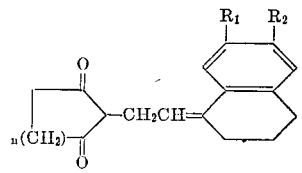

wherein $R_1$, $R_2$ and $n$ are defined as above, with a strong acid at reflux temperatures for a period of from about five to about fifteen minutes.

References Cited

UNITED STATES PATENTS 3,101,348  8/1963  Martin _____ 260—345.2

OTHER REFERENCES

Nazarov et al., Chemical Abstracts, vol. 51, cols. 16383–4 (1957) QD 1.A51.

HENRY R. JILES, *Primary Examiner.*

J. M. FORD, *Assistant Examiner.*